US012761786B2

(12) United States Patent
Garcia et al.

(10) Patent No.: US 12,761,786 B2
(45) Date of Patent: Oct. 13, 2026

(54) METHOD FOR PROCESSING VIDEO DATA FROM AN UNCERTIFIED VIDEO SOURCE

(71) Applicant: THALES, Meudon (FR)

(72) Inventors: Jean-Sébastien Garcia, Merignac (FR); Véran Helsen, Merignac (FR)

(73) Assignee: THALES, Meudon (FR)

( * ) Notice: Subject to any disclaimer, the term of this patent is extended or adjusted under 35 U.S.C. 154(b) by 0 days.

(21) Appl. No.: 18/389,201

(22) Filed: Nov. 13, 2023

(65) Prior Publication Data

US 2024/0192846 A1 Jun. 13, 2024

(30) Foreign Application Priority Data

Dec. 7, 2022 (FR) ....................................... 2212864

(51) Int. Cl.

| | |
|---|---|
| ***G06F 3/04886*** | (2022.01) |
| ***B64D 43/00*** | (2006.01) |
| ***G06F 3/041*** | (2006.01) |
| ***G06F 3/04842*** | (2022.01) |
| ***G06F 3/04845*** | (2022.01) |
| ***G06F 3/14*** | (2006.01) |

(52) U.S. Cl.

CPC ......... *G06F 3/04886* (2013.01); *B64D 43/00* (2013.01); *G06F 3/0418* (2013.01); *G06F 3/04842* (2013.01); *G06F 3/04845* (2013.01); *G06F 3/1423* (2013.01); *G06F 2203/04803* (2013.01)

(58) Field of Classification Search

CPC ............... G06F 3/04886; G06F 3/0418; G06F 3/04842; G06F 3/04845; G06F 3/1423; G06F 2203/04803; G06F 3/147; G06F 3/1454; B64D 43/00; G09G 2354/00; G09G 2370/16; G09G 2380/12; G09G 2380/14; G09G 5/14

See application file for complete search history.

(56) References Cited

U.S. PATENT DOCUMENTS 5,764,219 A * 6/1998 Rutledge ................ G06F 3/038 345/159
5,932,815 A * 8/1999 Dodds ..................... G01L 5/107 340/531
6,426,600 B1 * 7/2002 Lautzenhiser .......... G06F 3/012 318/625
6,448,977 B1 * 9/2002 Braun ................ G06F 3/03547 345/157

(Continued)

FOREIGN PATENT DOCUMENTS

FR 3 048 094 A1 8/2017
FR 3 094 964 A1 10/2020

*Primary Examiner* — Jose R Soto Lopez

(74) *Attorney, Agent, or Firm* — BakerHostetler

(57) ABSTRACT

A method for processing a data stream from an uncertified video source, the data stream being intended to be displayed at least partially on a display screen of a cockpit of an aircraft, the display screen having predetermined dimensions and a predetermined resolution. The processing method comprises a calibration mode comprising a step wherein a window of interest is selected on the display screen of the cockpit by the pilot. The processing method further comprises a step wherein a portion of the data stream corresponding to the selected window of interest is displayed on the display screen.

6 Claims, 5 Drawing Sheets

(56) References Cited

U.S. PATENT DOCUMENTS 6,956,558 B1 * 10/2005 Rosenberg ............ G06F 3/0354 345/184
6,975,302 B1 * 12/2005 Ausbeck, Jr. ......... G06F 3/0338 345/157
7,889,278 B2 * 2/2011 Kim ................... H04N 21/4438 348/565
8,013,837 B1 * 9/2011 Schroeder ............... G06F 3/011 345/157
8,395,583 B2 * 3/2013 Yamamoto ............ G06F 3/0346 345/159
9,106,696 B2 * 8/2015 Pahlavan ............ H04L 63/0853
9,383,961 B2 * 7/2016 Dusterhoff ............ G06F 3/1454
9,386,275 B2 * 7/2016 Oyman ................... H04L 65/65
9,811,066 B1 * 11/2017 Linnell ................. G06F 3/0362
10,073,611 B2 * 9/2018 Jin ........................ G06F 3/1423
10,126,999 B1 * 11/2018 Redman ................. G09G 5/397
2002/0047830 A1 * 4/2002 Philipson ............ G06F 3/04892 345/157
2003/0169233 A1 * 9/2003 Hansen ................. G06F 3/0386 345/158
2006/0221237 A1 * 10/2006 Min ......................... H04N 5/45 348/588
2008/0055241 A1 * 3/2008 Goldenberg ........ G06F 3/04812 345/156
2010/0001132 A1 * 1/2010 Detouillon .......... G06F 3/04886 345/173
2010/0073486 A1 * 3/2010 Tai ........................ G06F 3/0338 345/184
2010/0261526 A1 * 10/2010 Anderson ............... G06F 3/016 345/157
2010/0268694 A1 * 10/2010 Denoue ................. G06F 16/954 707/693
2010/0282844 A1 * 11/2010 Talir ...................... G06F 3/0362 235/404
2011/0194620 A1 * 8/2011 Tsai ....................... H04N 21/47 375/E7.076
2012/0092381 A1 * 4/2012 Hoover ............... G06F 3/04883 345/662
2012/0254790 A1 * 10/2012 Colombino ............. G06F 16/58 715/781
2013/0305391 A1 * 11/2013 Haukom ................. G06F 21/84 726/29
2014/0055401 A1 * 2/2014 Ye ........................... G06F 3/041 345/173
2014/0082538 A1 * 3/2014 Hibi .................... G06F 3/04845 715/769
2014/0111454 A1 * 4/2014 Hosoi ................. G06F 3/04883 345/173
2014/0223490 A1 * 8/2014 Pan .................... H04N 21/8186 345/173
2014/0267388 A1 * 9/2014 Smyth .................... B60K 35/29 345/173
2014/0306865 A1 * 10/2014 Pan ....................... G06F 3/1423 345/2.1
2014/0359493 A1 * 12/2014 Hong .................... G06F 3/1454 715/761
2014/0380137 A1 * 12/2014 Zhang ....................... G06F 8/76 715/202
2015/0007104 A1 * 1/2015 Zhu ....................... G06F 16/958 715/802
2015/0061972 A1 * 3/2015 Seo ................... H04M 1/72412 345/2.3
2015/0097757 A1 * 4/2015 Bang ..................... G06F 3/1454 345/2.2
2015/0169141 A1 * 6/2015 Kim ...................... G06F 3/0482 715/769
2015/0253875 A1 * 9/2015 Bochniak ............ G06F 3/03543 345/184
2015/0261408 A1 * 9/2015 Ostergren ........... G06F 3/04812 345/163
2015/0378643 A1 * 12/2015 Sumi ..................... G06F 3/1256 358/1.2
2016/0070275 A1 * 3/2016 Anderson .............. H04H 60/04 700/275
2016/0278611 A1 * 9/2016 Power ................. G06F 3/04886
2016/0349968 A1 * 12/2016 Daniel ............. G06V 30/18076
2017/0003769 A1 * 1/2017 Shimazaki ............ G06F 3/1454
2017/0024031 A1 * 1/2017 Ueda ...................... G09G 5/003
2017/0069255 A1 * 3/2017 Honkanen .............. G09G 3/002
2017/0147174 A1 * 5/2017 Olejniczak ......... H04N 21/4223
2017/0214889 A1 * 7/2017 Maciejewski .......... H04N 7/185
2017/0242564 A1 * 8/2017 De Bossoreille ........ G09G 5/14
2017/0262250 A1 * 9/2017 Tanabe ................... G09G 3/001
2017/0318334 A1 * 11/2017 Qin .................. H04N 21/43615
2017/0357403 A1 * 12/2017 Geary ................. G06F 3/04883
2018/0018020 A1 * 1/2018 Grant .................... G06F 3/0338
2018/0095656 A1 * 4/2018 Ingah ............... H04N 21/42208
2018/0364865 A1 * 12/2018 Li ....................... G06F 3/04883
2019/0012130 A1 * 1/2019 Honda ................. H04N 5/2624
2019/0243504 A1 * 8/2019 Shamasundar ....... G06F 3/0416
2019/0312935 A1 * 10/2019 Selvarajan .............. H04L 67/12
2020/0007921 A1 * 1/2020 Ojala ................. H04N 21/4345
2020/0310738 A1 * 10/2020 Lee ....................... G06F 3/0484
2020/0326205 A1 * 10/2020 Garcia .................. G06F 3/1454
2020/0353349 A1 * 11/2020 Palmer ................ A63F 13/2145
2020/0374488 A1 * 11/2020 Boyce .................... H04N 7/147
2020/0379707 A1 * 12/2020 Kwon ................... G06F 3/1454
2021/0200501 A1 * 7/2021 Stankoulov ........... G06F 3/0488
2022/0164247 A1 * 5/2022 Mead ...................... G06F 21/84
2022/0324327 A1 * 10/2022 Huang .................. G06F 3/1454
2022/0351330 A1 * 11/2022 Wu ..................... G06F 3/04845
2022/0366617 A1 * 11/2022 Li ........................... G06T 11/00
2023/0034520 A1 * 2/2023 Ogle ................... G06F 3/04886
2023/0051956 A1 * 2/2023 Wallach ................ G06F 3/1454
2023/0161542 A1 * 5/2023 Lee ....................... G06F 3/1454 345/2.2
2023/0333703 A1 * 10/2023 Zhou ....................... G06F 3/038
2023/0386357 A1 * 11/2023 Fujisawa .................. G09B 9/24
2024/0012503 A1 * 1/2024 Li ...................... H04N 21/4122
2024/0020084 A1 * 1/2024 Lee ........................... G06T 7/20
2024/0053879 A1 * 2/2024 Wang .................... G06F 3/0486
2024/0094881 A1 * 3/2024 Li ........................... G06F 3/167
2024/0112299 A1 * 4/2024 Wu ........................... G06T 3/04
2024/0119971 A1 * 4/2024 Huang ................. G11B 27/036
2024/0184501 A1 * 6/2024 Wang ...................... G06F 9/542
2024/0231586 A1 * 7/2024 Bian ................... G06F 3/04883
2025/0216909 A1 * 7/2025 Lee ....................... G06F 1/1677

* cited by examiner

METHOD FOR PROCESSING VIDEO DATA FROM AN UNCERTIFIED VIDEO SOURCE

CROSS-REFERENCE TO RELATED APPLICATION

This application claims priority to foreign French patent application No. FR 2212864, filed on Dec. 7, 2022, the disclosure of which is incorporated by reference in its entirety.

FIELD OF THE INVENTION

The present invention relates to the field of aeronautics, and more particularly to the field of human-machine interactions within a cockpit of an aircraft.

BACKGROUND

Software developed for the field of avionics address critical functions and require a demanding level of supervision to ensure the required safety conditions are met. Their evolution is controlled and limited.

Digitization of technical media has been permitted through electronic flight bags (EFBs). An EFB is an electronic information-management device that helps the aircraft pilot perform flight-management tasks more easily and effectively with less paper. It is a general-purpose computer platform intended to reduce or replace paper-based reference material such as flight manuals, operating manuals and navigation charts.

The emergence of an increasingly developed connected network, to which the EFB is attached, has made it possible to envisage increasingly advanced open-world applications that complement the functionalities of the certified cockpit. The non-criticality of these applications, which are not subject to the DO178 certification process, permits rapid, regular and cost-effective evolution.

To facilitate operational continuity between avionics applications displayed in the cockpit and open-world applications natively displayed on the EFB, it would be advantageous to be able to display the content of open-world applications using one or more cockpit display screens. This makes it possible to increase the amount of space in the cockpit through avoidance of the use of an additional display screen. Specifically, use of an additional display screen may limit external visibility and require complex installation if it is to be within easy reach of the pilot. Furthermore, avionics display screens are able to achieve a display performance in terms of brightness and reduction of reflections that a tablet screen cannot.

To best integrate open-world applications and to facilitate pilot missions, it is known in the prior art to use a device to display open-world content on a cockpit display screen via a video connection. By "open-world", what is meant is that the data are accessible to the general public. These data are said to be uncertified in the safety sense. The certified "cockpit" world is subject to validation by authorities (EASA).

Any datum delivered by an open-world device is considered uncertified. These devices may be laptops or tablets.

Below, an uncertified video source is considered to be any application of an open-world device delivering video data, i.e. data including images, image sequences and voice.

Such a prior-art device is in particular illustrated in FIG. 1. This device 1 comprises a tablet 10, a tablet universal adapter or TUA 11 and a display screen 120 of a cockpit 12.

The tablet is here a mass-market touch-screen tablet configured to deliver video data following a request from the cockpit.

As things stand, it is the avionics platforms that process the video stream output from such tablets. The first thing such processing must do is remove "black bands" as best as possible. It is a question of a problem with the width/height ratio of the tablet image and of the display area available in the cockpit for content (portion of the screen or whole screen). The regions around the tablet image are filled with black in the video stream (which possesses its own 16:9 ratio as video standard).

There is a continuing need to improve human-machine interactions within the cockpit, to facilitate display of data useful to the pilot.

SUMMARY OF THE INVENTION

The present invention aims to meet this need at least in part.

More particularly, the present invention relates to a method for processing a data stream from an uncertified video source, said data stream being intended to be displayed at least partially on a display screen of a cockpit of an aircraft, said display screen having predetermined dimensions and a predetermined resolution, said processing method comprising:

- a step in which the uncertified video source delivers the data stream;
- a step in which the data of the data stream are configured so as to adapt said data to the dimensions and resolution of the display screen of the cockpit;
- a pilot being able to interact with the display screen in the cockpit, a step in which interaction coordinates are transferred to the uncertified video source via the adapter so that the video source delivers data of the stream in accordance with the interaction between said pilot and the display screen, said processing method further comprising:
- a step in which a calibration mode is switched to, said calibration mode comprising, on the one hand, selection on the display screen of the cockpit of a window of interest by the pilot, said selection of a window of interest deactivating the step of transferring interaction coordinates, and on the other hand, an operation of cropping the stream depending on said window of interest;
- a step in which a portion of the data stream corresponding to the selected window of interest is displayed on the display screen.

Thus, the pilot is able to manually configure the window of interest so as to optimize display of a portion of the data stream. This window of interest corresponds to the video stream extracted from the open-world device and displayed on the avionics screen.

It is thus solely the avionics platform that crops and resizes the image depending on the window of interest, and that durably stores the information defining the selected window of interest.

Interaction is then possible, regardless of the selected window of interest. Furthermore, in the step in which a portion of the data stream corresponding to the selected window of interest is displayed, interaction with the tablet remains compliant regardless of the selected window of interest.

The user therefore calibrates the window of interest of the open-world device from the avionics display screen.

In one particular embodiment, the window of interest is selected directly by the operator via contact with the display screen.

In one particular embodiment, a contact with one of the edges of the screen and a movement of the operator's finger in continuous contact with the screen allow the limits of the window of interest to be defined.

In one particular embodiment, another contact with a corner of the window of interest and a movement of the operator's finger in continuous contact with the screen allow the dimensions of said window of interest to be adjusted.

In one particular embodiment, another contact inside the window of interest and a movement of the operator's finger in continuous contact with the screen allow the position of the window of interest to be moved.

In one particular embodiment, the window of interest is selected by the operator via at least one touch knob, allowing finer adjustment along a horizontal axis and adjustment along a vertical axis of a size of said window of interest.

This improves the precision of the selection, in particular when turbulence is encountered during selection.

In one particular embodiment, an acceleration law allows a selection speed of the window of interest to be diminished during rapid movements of the touch knob.

In one particular embodiment, the step of transferring interaction coordinates comprises transferring conversion parameters to the adapter.

In one particular embodiment, when a calibration mode is switched to, the entire data stream is displayed, the portion of the data stream corresponding to the selected window of interest being displayed with the entire data stream.

The whole of the video stream is displayed on the avionics screen. If a window of interest has been defined beforehand, this whole video stream is displayed on the avionics screen with the selected window of interest. This allows the selection window to be viewed with respect to the entire video stream available from the open-world device.

BRIEF DESCRIPTION OF THE DRAWINGS

The present invention will be better understood on reading the detailed description of embodiments which are given by way of non-limiting examples and illustrated by the appended drawings, in which.

DETAILED DESCRIPTION

The invention is not limited to the described embodiments and variants, and other embodiments and variants will appear obvious to those skilled in the art.

Figure 1:
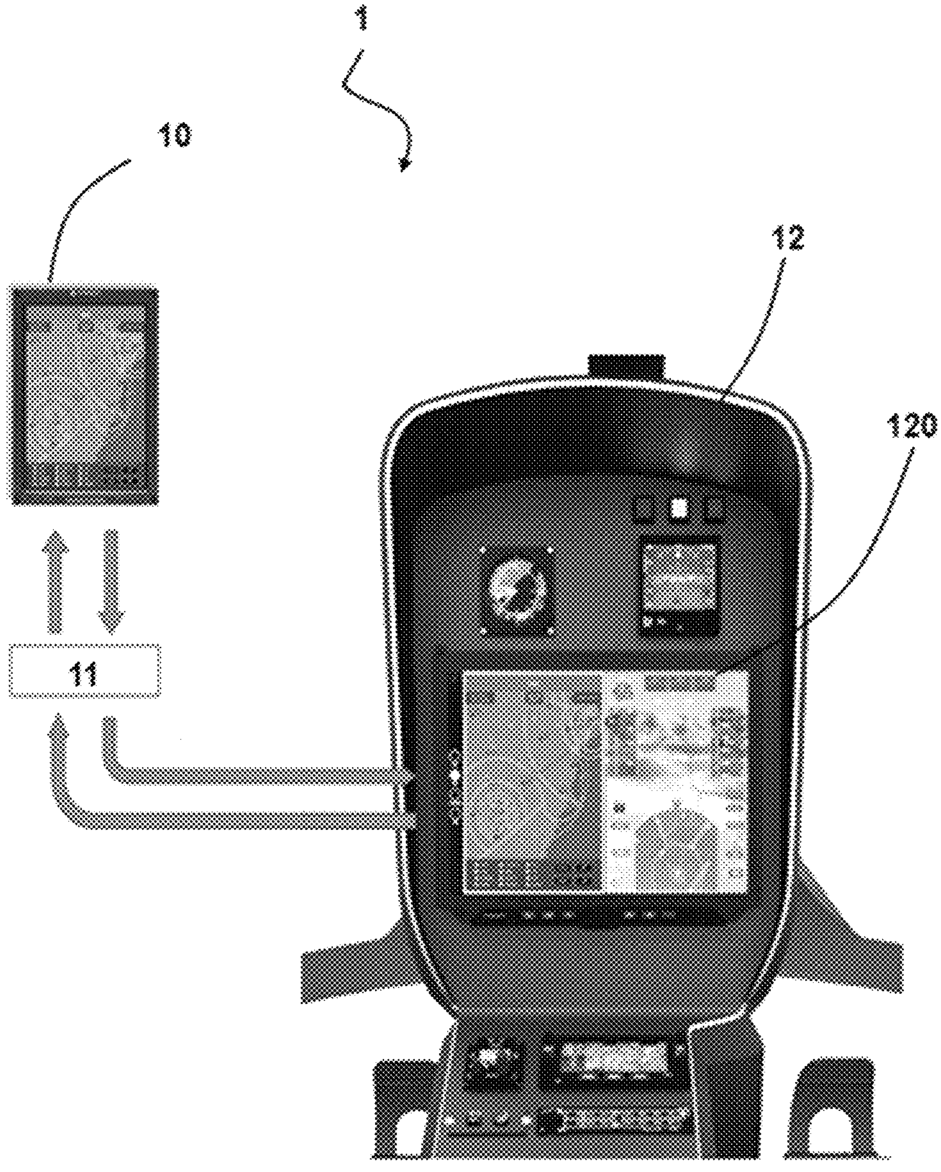
FIG. 1 illustrates a device for displaying open-world content on a screen of a cockpit according to the prior art.
Figure 2:
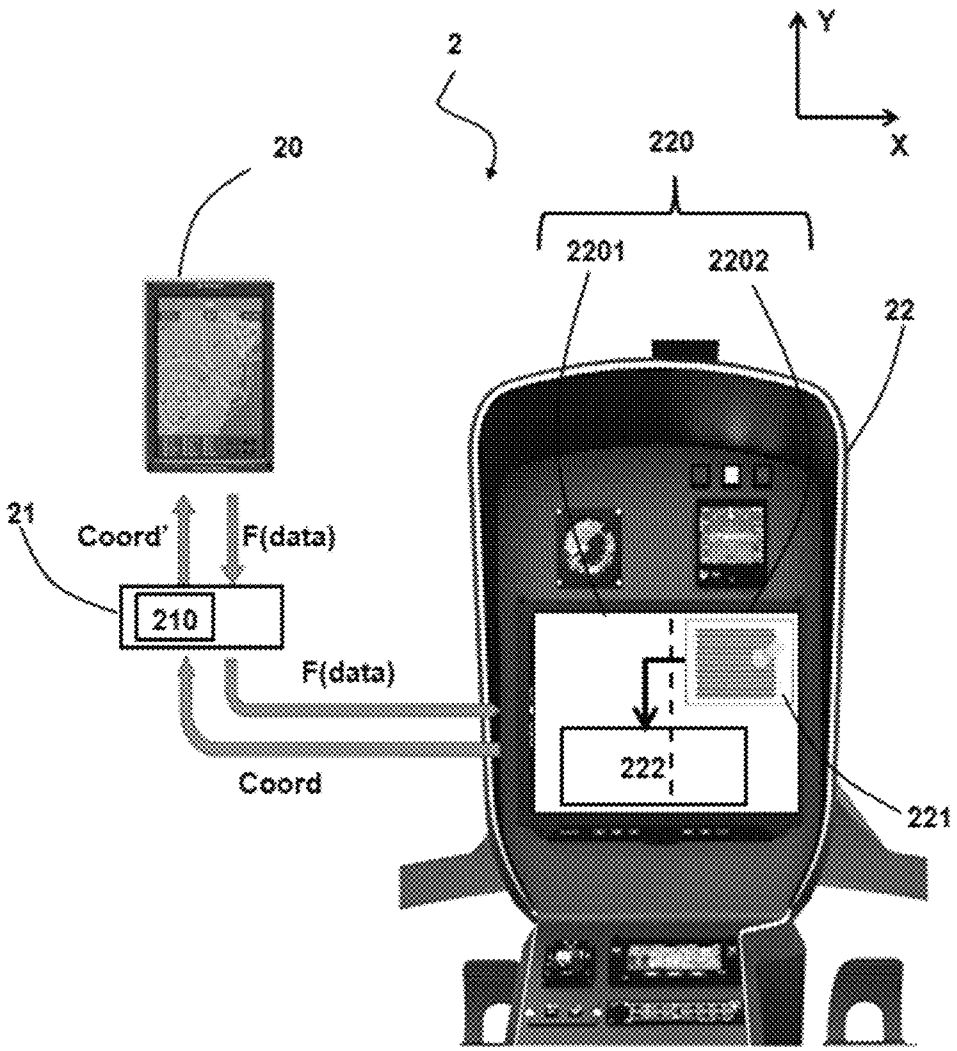
FIG. 2 illustrates a device for displaying an open-world data stream on a screen of a cockpit according to the invention using a first mode of selection of a window of interest.

FIG. 2 illustrates a device 2 for processing a data stream. This device comprises:

a tablet 20;

an adapter 21;

a display screen 220.

The tablet 20 is a mass-market touch-screen tablet.

The adapter 21 is placed between the tablet 20 and the display screen 220. This adapter 21 is able to receive interaction coordinates Coord with a view to processing them and delivering modified interaction coordinates Coord'. This coordinate processing consists in applying a change of coordinate system to the HID coordinate system of the tablet, the interaction being carried out by a pilot directly on the display screen 220. Through such processing, the display screen 220 becomes a remote screen of the tablet 20, for example with a view to interaction with functions represented in the form of icons on this tablet.

The display screen 220 is placed in the cockpit 22 of the aircraft. In the embodiment of FIG. 2, this display screen 220 is divided into two parts 2201, 2202. The first part 2201 is intended to display a data stream from an uncertified source delivered via the tablet 20. This first part 2201 may be positioned on the left or on the right of the display screen 220. The second part 2202 is intended to display a data stream from a certified source. The display screen 220 is here a touch screen combining a display functionality and a functionality allowing contact with a finger of the pilot to be used for selection purposes. This display screen comprises a detection unit 221 and a processing unit 222. The detection unit 221 is configured to detect the region of the display screen touched by the pilot's finger. The processing unit 222 is able to deliver coordinates of this point of contact in the coordinate system of the display screen 220.

It will be noted that, in an alternative embodiment, the display screen displays only the data stream from the uncertified source.

For example, the display screen 220 is in the 16:10 format in 1440×900.

Figure 3:
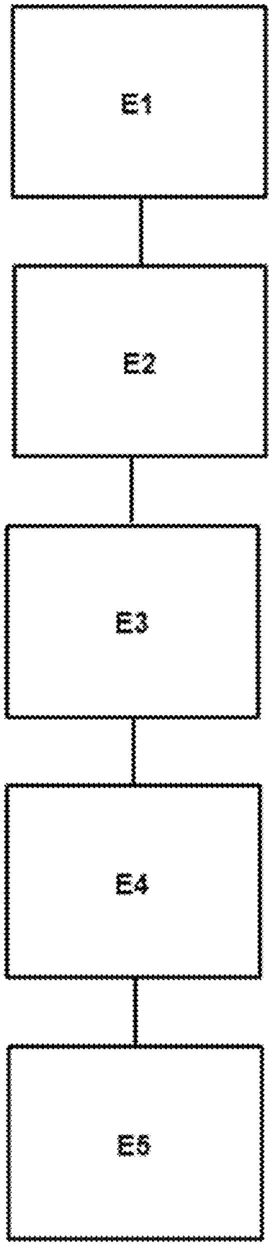
FIG. 3 illustrates the various steps of a method for processing a data stream, implemented by the device of FIG. 2.
Figure 4:
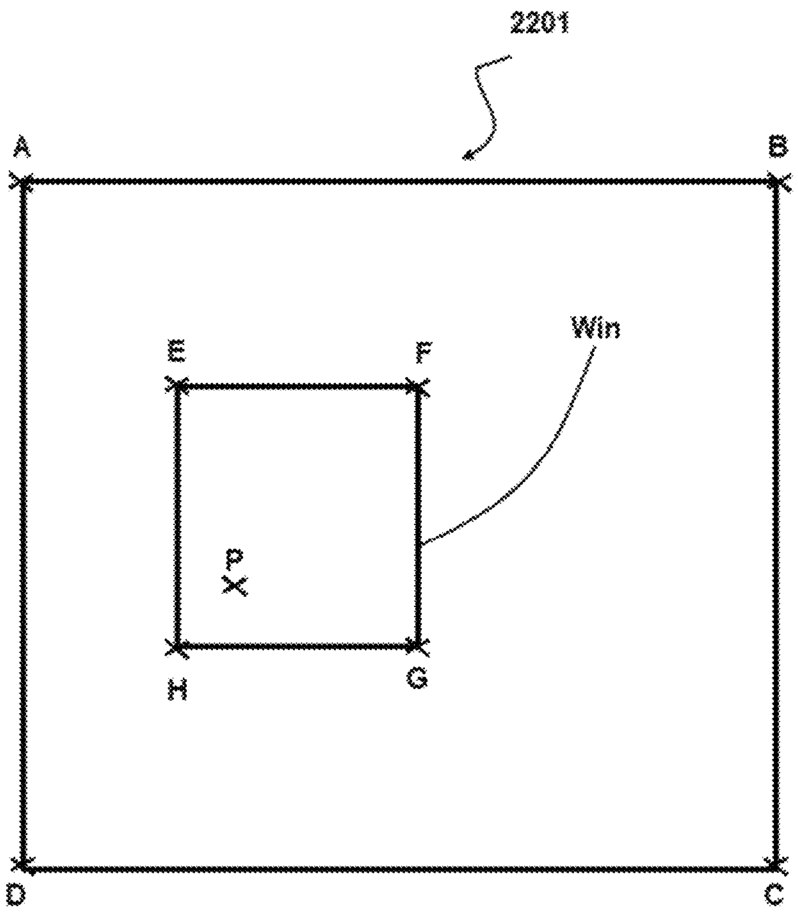
FIG. 4 illustrates the position of the window of interest on the display screen.

A method for processing video data will now be described with reference to FIGS. 3, 4 and 5.

In a first step E1, the data stream F is sent by the uncertified video source present on the tablet 20.

In a second step E2, the data of the data stream are adapted to the dimensions and resolution of the display screen 220. This second step E2 is carried out by a video adapter present in the avionics equipment integrated into the "display". There is an intermediate step between the first step E1 and the second step E2, which is carried by a unit 210 present in the adapter 21. This unit 210 is thus configured to force the tablet 20 to output a video stream of a certain resolution, 1280×720p for example. The unit 210 also allows the HDMI video stream of the tablet 20 to be converted to an avionics format, such as the SMPTE avionics format or the ARINC 818 avionics format.

In a third step E3, the pilot interacts with the display screen in the cockpit. For example, the pilot presses on a point P shown in FIG. 4. This point P has the coordinates $Touch_X$, $Touch_Y$ in the first part 2201 of the display screen 220. It will be noted here that this first part 2201 has a rectangular shape and is defined by points A, B, C, D forming the four corners of this rectangle. In the coordinate system of the display screen, point A has coordinates {0, 0}, point B has coordinates {MAX_TX, 0}, point C has coordinates {MAX_TX, MAX_TY}, and point D has coordinates {0, MAX_TY}.

The coordinates of the point P are transmitted to the adapter 21. The latter will then adapt them to the coordinate system of the tablet 20, adapted coordinates Coord' of the point P then being delivered. On receiving these adapted coordinates, the tablet 20 will deliver data of the stream F in accordance with the interaction exerted by the pilot on the display screen. Information on the rectangle ABCD is transmitted to the adapter 21, this allowing it to compute the conversion of the coordinates received from the avionics to Coord'.

The method then passes to a calibration mode in which step E3 of transferring interaction coordinates is deactivated. In a step E4, the pilot selects a window of interest Win on the display screen 220. Such a window is in particular illustrated in FIG. 4.

Thus, step E4, which comprises calibration of the window of interest, takes priority over step E3. When step E4 has finished, step E3 may resume the transfer of interaction coordinates.

This window of interest Win has a rectangular shape and its outline is defined by the points E, F, G, H. Thus, point E has the coordinates $\{t_x, t_y\}$. Point F has the coordinates $\{t_x+t_w, 0\}$. Point G has the coordinates $\{t_x+t_w, t_y+t_h\}$. Point H has the coordinates $\{0, t_y+t_h\}$. Information on the rectangle EFGH is transmitted to the adapter 21, this allowing it to compute the conversion of the coordinates received from the avionics to Coord'.

A cropping operation is then applied to the video stream depending on this window of interest Win. It is carried out in the unit integrated into the avionics equipment. In a step E5, the portion of the data stream corresponding to the selected window of interest Win is displayed on the display screen 220. The windowing information delivered to the adapter 21 is also updated to modify the conversion calculation of the coordinates Coord' accordingly. This makes it possible to ensure interactions between the avionics screen and the tablet remain compliant, regardless of the selected region of interest, not only for touch interactions but also for cursor/CCD (mouse-type) interactions.

The region of interest Win may be delineated by the pilot in various ways.

Preferably, a contact with one of the edges of the display screen and a movement of the operator's finger in continuous contact with the display screen 220 allow the limits of the window of interest Win to be defined.

Preferably, another contact with a corner of the window of interest Win and a movement of the operator's finger in continuous contact with the display screen allow the size of said window of interest Win to be adjusted.

Preferably, another contact inside the window of interest Win and a movement of the operator's finger in continuous contact with the display screen 220 allow the position of the window of interest Win to be moved.

Figure 5:
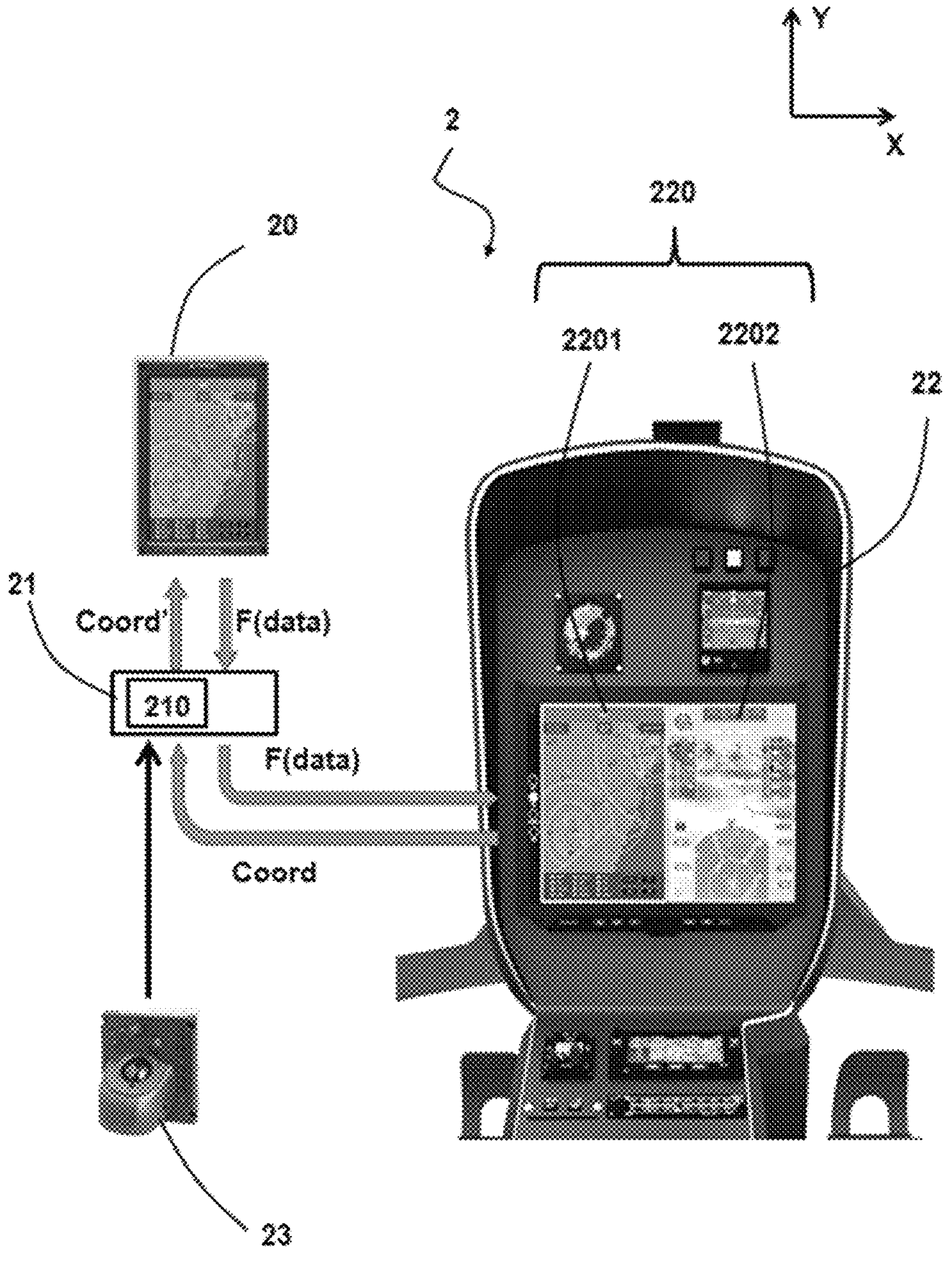
FIG. 5 illustrates a device for displaying an open-world data stream on a screen of a cockpit according to the invention using a second mode of selection of a window of interest.

FIG. 5 illustrates a variant of embodiment, in which the window of interest Win is selected by the pilot via at least one touch knob 23. This touch knob 23 allows adjustment along the horizontal axis X and adjustment along the vertical axis Y of the dimensions of said window of interest Win. It takes the form of a rotary switch making it possible to select the outlines of the window of interest in the first part 2201 of the display screen 220 directly. In one preferred embodiment, the device 2 for displaying the video data comprises a dual rotary encoder directly present on the screen in order to allow easier selection of the outlines of the window of interest along the X axis and along the Y axis.

Preferably, an acceleration law allows a selection speed of the window of interest Win to be diminished during rapid movements of the touch knob 23.

The invention thus allows:

the media-delegation capability to be adapted to a wide variety of tablets, without requiring a software update (on-board software or firmware);

the video calibration and the interaction region to be taken into account: so-called dual-touch and CCD touch interactions continue to work, without offset, whatever the selected video region.

The invention is not limited to the described embodiments and variants.

Thus, one additional capability allows any ambiguity in the risk of masking information in the "useful" video stream to be removed by making it possible to quickly view the entire stream and the rendering of the active selection region. Specifically, when a calibration mode is switched to from step E3, the entire stream received is displayed. It is this property, which is quick access, that makes it possible to remove doubt. This capability helps to respond in part to a fear expressed by the European Union Aviation Safety Agency (EASA) that content will be masked.

The invention claimed is:

1. A method for processing a data stream from an uncertified video source delivered via a tablet, said data stream being displayed at least partially on a display screen of a cockpit of an aircraft, said display screen becoming a remote screen of the tablet through said processing method, said display screen having predetermined dimensions and a predetermined resolution, said processing method comprising:

the uncertified video source delivers the data stream to the display screen through a video stream adapter of said cockpit;

the adapter requests the uncertified video source to output the data of the data stream to the predetermined dimensions and predetermined resolution of the display screen of the cockpit;

an interaction being made with the display screen and interaction coordinates are transferred to the uncertified video source via the adapter the uncertified video source, in reaction to the coordinates transfer delivering data of the data stream in accordance with the interaction with the display screen, said processing method further comprising:

a calibration step wherein a calibration mode is switched to, said calibration mode comprising, displaying the entire data stream;

a selection on the display screen of the cockpit of a window of interest of the data stream displayed on the display screen; wherein a portion of the data stream corresponding to the selected window of interest being displayed with the entire data stream, wherein features of the selected window of interest being transmitted to the adapter and the adapter adapting, if needed the interaction coordinates with the window of interest taking into account said features, and an operation of cropping the data stream by the display screen depending on said window of interest; and a display step wherein the portion of the data stream corresponding to the selected window of interest is displayed on the display screen.

2. The processing method according to claim 1, wherein the window of interest is selected directly by the operator via contact with the display screen.

3. The processing method according to claim 1, wherein a contact with one of the edges of the display screen and a movement of the operator's finger in continuous contact with the display screen allow the limits of the window of interest to be defined.

4. The processing method according to claim 2, wherein another contact with a corner of the window of interest and a movement of the operator's finger in continuous contact with the display screen allow the size of said window of interest to be adjusted.

5. The processing method according to claim 2, wherein another contact inside the window of interest and a movement of the operator's finger in continuous contact with the display screen allow the position of the window of interest to be moved.

6. The processing method according to claim 1, wherein the window of interest is selected by the operator via at least one touch knob, allowing adjustment along a horizontal axis and adjustment along a vertical axis of the dimensions of said window of interest.

* * * * *